Nov. 30, 1937.　　　D. F. W. COFFEY　　　2,100,634
APPARATUS FOR PROJECTING PICTURES IN RELIEF
Filed Nov. 27, 1931　　　3 Sheets—Sheet 1

INVENTOR
Douglas Frederill Winnah Coffey
BY
Kenyon & Kenyon
ATTORNEYS

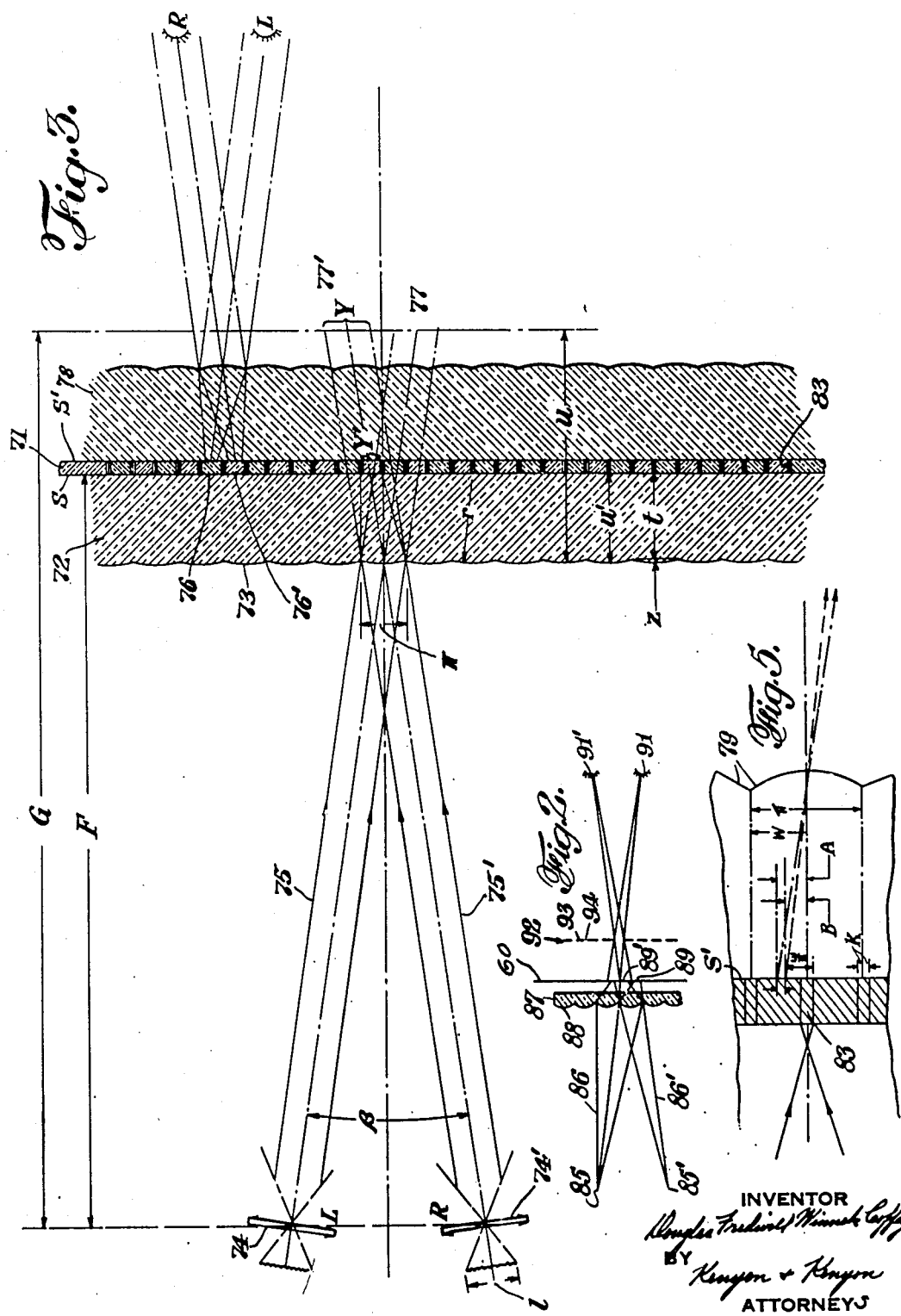

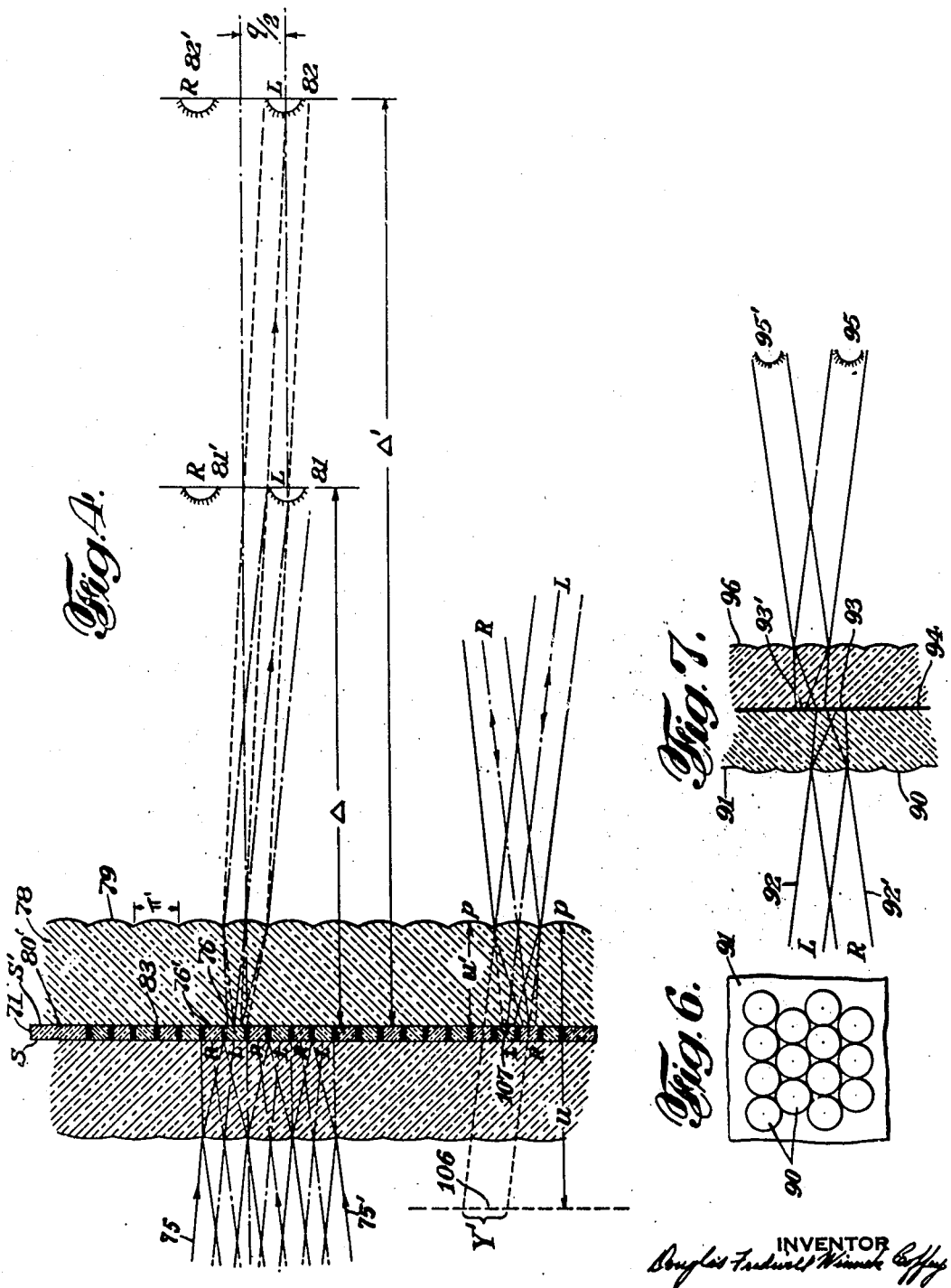

Patented Nov. 30, 1937

2,100,634

UNITED STATES PATENT OFFICE 2,100,634

APPARATUS FOR PROJECTING PICTURES IN RELIEF

Douglas Fredwill Winnek Coffey, New York, N. Y., assignor to Winnek Stereoscopic Processes, Incorporated, Wilmington, Del., a corporation of Delaware Application November 27, 1931, Serial No. 577,519

2 Claims. (Cl. 88—24)

This invention relates to apparatus for the portrayal of pictures or other representations of objects in stereoscopic relief. This invention is particularly adapted to the portrayal of pictures which may be referred to herein broadly as covering not only photographed natural objects but also other representations or drawings of objects, diagrams, maps, and the like, so that pictures such as so-called motion pictures projected on a motion picture screen, may be observed in stereoscopic relief.

It is a purpose of this invention to achieve in pictures the same illusion of stereoscopic relief that is obtained when individuals having normal vision observe objects in nature. As viewed by individuals having normal vision, objects appear in three dimensions, that is, the observed objects appear to have length, width, and also a third dimension, depth—the distance or depth between the foreground and the background causing the objects in the picture to stand out in relief. To be able to see depth, an object must be viewed with both eyes. The left and right eyes of the ordinary individual are separated by an average distance of 2.5 inches, approximately 65 mm. When the eyes are focused upon an object, the left eye and the right eye each view the object from a different angle of observation. Not only is the object on which the eyes are focused viewed from different angles, but also the background of the object is viewed by the right and left eyes in different relation to the object upon which the eyes are focused. This observation of objects by the left and right eyes from different angles is responsible for the appearance of depth and causes the observed objects to stand out in relief. While certain pseudoscopic depth effect is seen with one eye under certain conditions, true stereoscopic relief is visible only when the right eye sees the right view only of the observed object and the left eye sees the left view only of the observed object.

It is an object of this invention to project motion pictures, for example, so that an observer may see with his right eye only a right stereoscopic view imaged on the motion picture screen and with his left eye only a corresponding left view and so that the picture in this manner may be observed in true stereoscopic relief with a maximum of brilliancy, with a minimum of eye strain and without the use of observation apparatus such as glasses, movable shutters or the like.

It is one of the features of this invention that left and right stereographic views are projected upon a flat translucent image screen in a plurality of left and right image portions which exist independently of each other on the image screen. It is a further feature of this invention that light from independently existing left and right image portions on such image screen is directed so that the left and right eyes of an observer may see the left and right image portions respectively and exclusively and in such apparent continuity and apparent simultaneousness that the portrayed picture projected on the image screen appears to stand out in stereoscopic relief as though it were being viewed with both the right and left eyes as in nature.

It is an advantage of this invention that left and right stereographic pictures suitable for projection so as to be visible in stereoscopic relief may be made with ordinary binocular photographing apparatus or even with monocular photographing apparatus manipulated so as to take left and right exposures of the subject under consideration. It is a further advantage of this invention that binocular projecting apparatus of simple and well-known type or matched monocular projecting apparatus may be employed in connection with the projection of left and right stereoscopic views so as to make them visible in stereoscopic relief according to this invention.

When binocular projectors, or other means, are used for projecting left and right stereographic views either simultaneously or alternately in substantially superimposed relation upon an image screen, it is a feature of this invention that a resolving screen may be used for resolving the left and right views into a plurality of independent stereographic translucent image portions such as bands on the image screen which is flat and disposed in a single plane. It is also a feature of this invention that a lenticular selective screen serves to direct the left and right stereographic image portions such as bands on the image screen exclusively to the left and right eyes respectively of an observer. Thus, in the practice of this invention a composite viewing screen is afforded which enables an observer without more to see projected pictures in true and life-like stereoscopic relief.

It is a feature of this invention that when left and right stereographic views may be projected to form substantially superimposed images, the projected left and right stereographic views may be broken up into a plurality of left and right image bands by means of a resolving screen having alternate parts of opacity and transparency. Thus, for example, a screen or grating of glass, gelatin, cellulose acetate, or other suitable material, having alternate opaque and transparent, substantially vertical bands thereon may be used. The beams of light from the projectors of left and right stereographic pictures may be caused to pass through the transparent portions of the grating at a horizontal angle to each other. By interposing the grating at a proper distance between the horizontally disposed projectors and the image screen, left and right portions such as bands passing therethrough may be made to fall alternately and independently with respect to each other upon the image screen.

Left and right stereographic views may be resolved into left and right image bands upon an image screen not only by means of a grating or other screen having alternate opaque and transparent bands, such as described above, but by other means as well, according to this invention. For example, left and right stereographic pictures projected so as to become substantially superimposed from laterally disposed projecting sources may be made to fall in the form of alternate left and right image bands upon an image screen by interposing a screen of lenticular or other structural construction between the projectors and the image screen. By way of specific illustration, a lenticular screen having a plurality of vertical lenticular ridges may be used as a resolving screen. The beams of light from the projecting sources that pass through the lenticular ridges are laterally contracted due to the lens action of the lenticular ridges and pass at a horizontal angle to each other therethrough thus forming substantially independent vertical alternately disposed left and right image bands upon the image screen. The size of the image bands may be controlled by factors such as the distance of the projecting sources from the image screen, curvature of the lenticular ridges, the distance of the ridges from the image screen, and the like.

The use of lenticular construction, according to this invention, is in certain respects preferable to the use of a grating construction having alternate opaque and transparent areas therein for the reason that substantially all of the light from the projecting sources is allowed to pass through the resolving lenticular screen and thus produce image portions or bands of greater brilliancy. In this connection, however, the image bands produced by a resolving grating having areas of opacity is not undesirably diminished when a translucent image screen is used. A translucent image screen has been found to give approximately four times the brilliancy of a screen illuminated by reflected light. Even when a grating is used having opaque bands thereon, a translucent image screen will appear more brilliantly illuminated than an ordinary reflecting screen would under the same conditions. Moreover, when a grating is used, light from each of two projecting sources is permitted to fall upon the image screen in alternate areas which cover substantially all portions of the image screen, thus illuminating the image screen approximately as brilliantly as if a single projecting source had been used without the interposition of a grating having opaque areas. Any screen which is adapted to resolve left and right stereographic pictures projected from laterally disposed sources so as to form substantially superimposed images into independent left and right image portions upon an image screen will be referred to generally herein as a "resolving" screen, whether the optical structure of the screen comprises successive areas of opacity and transparency, lenticular construction or other angular construction of optical substances, or color screens, reflectors, etc., or combinations of such optical structures.

To the end that independent left and right stereographic image portions which are projected upon an image screen and which would appear distorted and blurred if viewed directly be brought to the eyes of an observer to give the illusion of true stereoscopic vision, a screen having lenticular construction is used. Rays of light from alternate left and right image portions such as bands on the image screen may be directed through lenticular directing means so that the left and right eyes of an observer will be able to view left and right image portions exclusively and respectively upon the image screen and achieve stereoscopic vision. The image bands may be magnified in passing through the lenticular ridges so as to present substantially continuous left and right views to the left and right eyes of an observer. Moreover, where a lenticular screen is used, it is apparent that all of the light from the image screen is permitted to pass through the lenticular screen, thus causing no diminution in the brilliancy of the images viewed on the image screen.

Any screen which is of lenticular construction and which is adapted to selectively direct a plurality of independent left and right image portions projected on an image screen exclusively to the left and right eyes respectively of an observer will be referred to herein as a "selective" screen. The optical structure of such selective screens may comprise lenticular or other angular construction of optical substances, etc., or combinations of such optical structures. It has been found that when such a selective screen is used, the plurality of image portions may be seen therethrough not only as clear and continuous but also in lifelike stereoscopic relief.

At all points in a theatre a slight movement of the head by an observer is all that is necessary to cause the light from the left and right image portions projected on the image screen to come to his eyes according to this invention in such manner as to produce the illusion of stereoscopic relief. Such slight movement of the head would normally occur involuntarily and the observer would naturally see the projected pictures in stereoscopic relief. When this invention is employed, the observer is hindered in no way by individual viewing apparatus of any sort, and the illusion of stereoscopic relief may be obtained with startling realism from all seats in the theatre.

It is a further advantage of this invention that it is adapted for portraying not only photographed objects in stereoscopic relief but also drawings, cartoons, caricatures, advertisements, and other pictures, either still or in motion, in stereoscopic relief. Moreover, this invention is also applicable in viewing in stereoscopic relief pictures which are projected by so-called television apparatus. This invention is not only adapted for theatrical use but other uses as well such as advertising signs, projection of aerial photographs for military purpose, and the like.

It is an advantage that composite viewing means embodying this invention are adapted not only for the portrayal of pictures in stereoscopic relief but also are adapted for the showing of flat or monocular pictures such, for example, as the motion pictures which are commonly shown in moving picture theatres at the present time. When a flat or monocular picture is projected on the composite screen, the picture will appear as it does today. This is of considerable commercial advantage, as the installation of a composite viewing screen embodying this invention will not interfere in any way with the projection of flat or monocular motion picture films which are on the market at the present time or which may hereafter be made.

Other objects, features, advantages and purposes of this invention will become apparent from the following description of the accompanying drawings showing certain illustrative embodiments of this invention, wherein Figure 1 is a plan view of a theatre wherein a composite viewing screen embodying this invention is used and is illuminated by transmitted light from a pair of binocular projectors adapted for the continuous projection of motion pictures.

Fig. 2 is a small plan view of a composite screen embodying another modification of this invention i. e. a translucent image screen in connection with a lenticular resolving screen and a grating as a selective screen.

Fig. 3 is an enlarged plan view of a further embodiment of this invention comprising lenticular resolving and selective screens used in connection with a translucent image screen. Angles and distances are indicated from which by suitable formulas the construction and location of the resolving screen may be determined.

Fig. 4 is a view similar to Fig. 3 only showing distances and angles from which the construction and location of the lenticular selective screen may be determined.

Fig. 5 is an enlarged plan view showing one of the lenses of the lenticular selective observing screen shown in Figs. 3 and 4 and indicates certain angles and lines from which the construction and location of the lenticular selective screen may be calculated.

Fig. 6 is a front view of a modified form of a lenticular screen which may be employed according to this invention.

Fig. 7 is a plan view of a composite viewing screen employing lenticular screens similar to the screen shown in Fig. 6 in connection with a translucent image screen.

Figure 1:
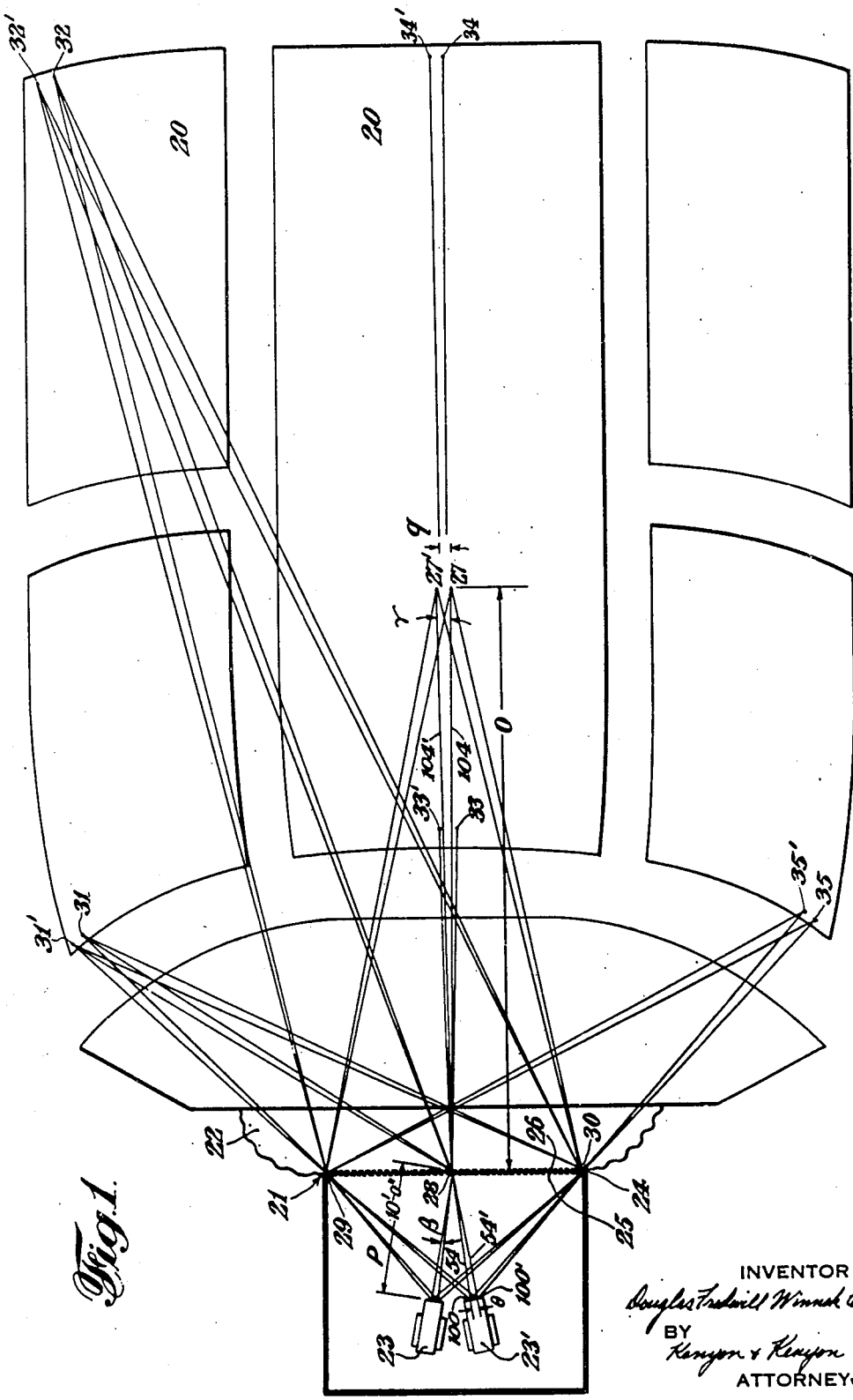

In the above drawings, it is apparent that true proportions cannot be observed if the detail of composite screens embodying this invention is to be brought out and the manner of operation of the various embodiments thereof is to be successively illustrated. Illustrations of specific construction with dimensions and proportions will, however, be given below which may be employed in portraying motion pictures, for example, in stereoscopic relief according to this invention. Moreover, formulas from which suitable dimensions and proportions may be calculated for the construction of projecting apparatus and viewing screens embodying this invention under different conditions will also be given.

Fig. 1 illustrates this invention as embodied in a motion picture theatre for the portrayal of motion pictures in stereoscopic relief to observers seated in various parts of the theatre. The theatre is indicated diagrammatically as having seating sections 20 and a composite viewing screen 21 (shown conventionally) on the stage 22, screen 21 being illuminated by a pair of binocular projectors 23 adapted for the continuous projection of motion pictures. Each of the binocular projectors 23 is adapted for the projection of left and right stereographic pictures so as to form substantially centered images. The composite viewing screen 21 may comprise a translucent image screen 24, a resolving screen 25 on the projector side of image screen 24, and a lenticular selective screen 26 on the observing side of screen 24. The selective screen 26 may be either of a grating construction having alternate opaque and transparent portions or of a lenticular construction, each of which constructions will be described more in detail below. The resolving screen causes a plurality of independent left and right image portions to fall on image screen 24. These left and right image portions are directed exclusively to the left and right eyes respectively of observers in the theatre by lenticular selective screen 26. An observer in the center of the theatre having left and right eyes 27 and 27' may see left and right image portions exclusively and respectively at any point on image screen 24 such as a point 28 in the center of the viewing screen, a point 29 at the right side of the viewing screen, or a point 30 at the left side of the viewing screen. It has been found that the plurality of left and right image portions on image screen 24 which are brought exclusively and respectively to the left and right eyes of the observer, appear to the eyes as a sharply defined continuous picture, the objects in which stand out realistically in stereoscopic relief. Similarly, an observer to the side and front of the theatre having left and right eyes 31 and 31' may also see the entire portrayed picture in stereoscopic relief, as may also an observer to the side and back of the theatre having left and right eyes 32 and 32'. At various other parts in the theatre the entire picture portrayed on the composite viewing screen may also be viewed in stereoscopic relief, according to this invention, as by observers having left and right eyes 33, 33'; 34, 34'; and 35, 35'.

An illustrative embodiment of this invention is shown in more detail in Figs. 3, 4 and 5. In these figures a composite viewing screen embodying this invention is shown as comprising resolving and/or selective screens which are made of transparent material but which nevertheless have resolving and selective capacities by virtue of their optical structure. The embodiment of this invention shown in Figs. 3, 4 and 5 comprises a resolving and selective screen having a plurality of vertical lenticular ridges which resolve left and right stereographic pictures into left and right image bands, and which direct left and right image bands exclusively to the left and right eyes respectively of an observer so as to afford true stereoscopic vision. The lenticular screens are shown in connection with a translucent image screen 71.

A lenticular resolving screen 72 having a plurality of lenticular ridges 73 is interposed between the image screen 71 and projecting sources 74 and 74' for projecting left and right stereographic pictures. The lenticular screen 72 is shown in substantial juxtaposition to image screen 71. Beams of light 75 and 75' projected from projecting sources 74 and 74' pass through lenticular ridges 73 at a horizontal angle to each other, and the lenticular ridges may be constructed and positioned so that positive left and right image bands 76 and 76' will fall in alternate position upon image screen 71. Preferably, the image bands are spaced somewhat from each other so that they may be viewed in stereoscopic relief through a selective lenticular screen (or grating) from a wider range of vision than would be possible if the image bands were in substantial juxtaposition. The image bands 76 and 76' are preferably imaged on image screen 71 by a positive lens system so that the individual image bands 76 and 76' will not be inverted with respect to the picture as a whole which is portrayed upon image screen 71. It is apparent that all of the light which is incident upon lenticular screen 72 from projecting sources 74 and 74' is permitted to pass through the screen 72 and is resolved into image bands by contraction and without absorption of any of the rays or diminution of the brilliancy of the projected picture.

A particular illustration of a composite viewing screen comprising an image screen and lenticular resolving and selective screens as employed in connection with a projecting apparatus for projecting left and right stereographic pictures from optical centers laterally disposed with respect to their focal plane, will now be described, as will also be described general formulas from which desirable relative distances and dimensions may be determined for projecting left and right stereographic pictures so as to make them visible in stereoscopic relief as a single picture. Since the metric system of measurement is commonly used in connection with lenticular optical apparatus, this system of measurement will be employed.

The distance F between the plane of projecting sources 74 and 74' and the surface S of screen 71 may be set arbitrarily at 3048 mm. (10 feet). It may also be assumed that if the width $\pi$ of the lenticular ridges 73 of screen 72 is 2 mm., there will be formed on screen 71 a desired plurality of left and right image bands to secure satisfactory definition and detail without undesirable diffraction phenomena. The distance U' from the centers of the lenticular ridges 73 to the surface S of translucent screen 71 may be assumed to be 10 mm. as being desirable for commercial manufacture. The left and right image bands 76 and 76' in order to be alternate with respect to each other and not overlapping, should be less than 1 mm. in width. Since image bands 76 and 76' are preferably spaced somewhat from each other, the width Y' of the image bands should, for example, be about .8 mm. in width. The radius $r$ of the lenticular ridges 73 made from optical material such as glass, the refraction index $n$ of which is 1.5, which will give image bands of desired width e. g., .8 mm., may readily be determined in the light of the following considerations.

The beams of light projected from projecting sources 74 and 74' may be considered as travelling in substantially parallel lines when they strike lenticular ridges 73 due to the fact that the distance of lenticular ridges 73 from image screen 71 is very relatively to the width of ridges 73.

While it would be more simple to design lenticular ridges 73 so that they will focus parallel beams of incident light as an inverted image, it is preferable not to do so as the individual image portions would be inverted with respect to the picture as a whole portrayed on the image screen 71. As pointed out above, it is preferable to employ a positive optical system in order to secure correctly positioned left and right image bands.

Projecting apparatus which forms image bands 76 and 76' on image screen 71 after having passed through lenticular ridges 73 would otherwise form corresponding images 77 and 77' which may be regarded as virtual image bands with respect to image bands 76 and 76'. Since the beams of light incident upon lenticular ridges 73 are substantially parallel, the width Y of virtual images 77 and 77' may be assumed to be substantially the same width as ridges 73, i. e., 2 mm., though this is not absolutely correct, as will be apparent below. With the above data it is possible to solve for U the distance from the center of lenticular ridges 73 to the plane of virtual images 77 and 77'.

$$U = \frac{Y}{Y'} \times U' = \frac{2}{.8} \times 10$$

$$U = 25 \text{ mm.}$$

Since U is determined, the radius $r$ of lenticular ridges 73 can also be determined $$\frac{n-1}{r} = \frac{1}{U'} - \frac{1}{U}; \quad \frac{1.5-1}{r} = \frac{1}{10} - \frac{1}{25}$$

$$r = 8.3 \text{ mm.}$$

The optical system having been determined, it is now possible to compute absolutely accurately the width Y of virtual images 77 and 77' for the optical system, calling the distance of the virtual images 77 and 77' from the plane of projectors 74 and 74' the distance G.

$$G = (F - U') + U = (3048 - 10) + 25 = 3063 \text{ mm.}$$

$$Y = \frac{G}{F-U} \times \pi = \frac{3063}{3048-10} \times 2 = 2.016 \text{ mm.}$$

The actual width Y' of image bands 76 and 76' may now be accurately determined.

$$Y' = \frac{U' \times Y}{U} = \frac{10 \times 2.016}{25} = .8064$$

Since there is bound to be some loss of detail at the edges of image bands 76 and 76', the width Y' of the bands is substantially .8 mm. as at the outset assumed to be desirable.

It is apparent from the above that if a lenticular screen is made up having lenticular ridges 2 mm. in width and with a radius of 8.3 mm. of optical glass which has an index of refraction of 1.5 and which is 10 mm. thick measured from the centers of lenticular ridges to the opposite plane side, such a lenticular screen will form left and right image bands .8 mm. in width on an image screen placed in juxtaposition with the plane side of the lenticular screen when left and right stereoscopic pictures are projected from projectors placed 3048 mm. (10 feet) from the image screen. The lateral separation of projecting sources 74 and 74' relative to image screen 71 may be adjusted so that the left and right image bands will lie in alternate positions on the image screen 71.

The alternate image bands 76 and 76' may be brought exclusively to the left and right eyes respectively of an observer by means of lenticular selective screen 78, similar in general construction to lenticular resolving screen 72. For example, lenticular screen 78 may have lenticular ridges 79 having a width $\pi'$ of 2 mm., and the distance $u'$ from the center of lenticular ridges 79 to the surface S' of image screen 71 may be 10 mm. The construction is shown in detail in Figs. 4 and 5.

The alternate image bands 76 and 76' should preferably be brought to the eyes of observers in steroscopic relief at various distances from the image screen 71. In Fig. 4, the distance Δ of an observer whose eyes are at 81 and 81' from image screen 71 is assumed to be 20 feet or 6,096 mm. Another observer having eyes 82 and 82' is shown at a distance Δ' from image screen 71, the distance Δ' being 90 feet or 21,336 mm. The selective lenticular screen 78 should not permit right image bands 76' to be observed by the left eyes of observers such as observers whose eyes are either at 81 and 81' or at 82 and 82' and vice versa. To this end, the areas on image screen 71 which are visible to the left and right eyes 82 and 82', for example, (the observer at the greatest distance) should not extend beyond the shadow bands 83 between the left and right image bands 76 and 76'. The distance $w$ therefore indicates the area 107 of observation on image screen 71 which an observer from points 82 and 82' is permitted to observe with each of his eyes $$\left(\frac{w}{2}\right.$$

being specifically shown in Fig. 5.) The distance $q$ between the eyes of the observer is 65 mm. Since the width of image bands 76 and 76' is approximately .8 mm. and since the width of the ridges 79 is 2 mm., the width $k$ of shadow bands 83 is .2 mm.

In order to determine the width $w$ of area 107 which the observer from 82 and 82' is permitted to see, the distance B must first be obtained, B being the distance from the center line of ridge 79 that a ray of light passing through the optical center of ridge 79 and between either of eyes 82 or 82' and the image screen becomes diverged at the plane of the image screen. Solving for B:

$$B = \frac{u'}{\Delta' - u'} \times \frac{q}{2} = \frac{10}{(21336-10)} \times \frac{65}{2}$$

$$B = .0152$$

Solving for $w$:

$$w = 2\left(B + \frac{K}{2}\right) = 2\left(.0152 + \frac{.2}{2}\right)$$

$$w = .2304 \text{ mm.}$$

Since the distance from the observer whose eyes are at 82 and 82' is very great with respect to the width of lenticular ridges 79, it may be assumed that light passes between these points in parallel lines. It may thus be assumed that the width $y$ of virtual images 106 corresponds to the width $\pi'$ of ridges 79, i. e., 2 mm. Solving for $u$ the distance of virtual images 106 from the center of ridges 79

$$u = \frac{v}{w} \times u' = \frac{2 \times 10}{.2304}$$

$$u = 86.7 \text{ mm.}$$

Solving for $r'$ the radius of curvature of ridges 79

$$\frac{n-1}{r'} = \frac{1}{u'} - \frac{1}{u}; \quad \frac{1.5-1}{r} = \frac{1}{10} - \frac{1}{86.7}$$

$$r' = 5.65 \text{ mm.}$$

It is thus seen that if a lenticular ridged screen is made up having ridges 2 mm. in width and 5.65 mm. in radius and is 10 mm. thick measured from the centers of the ridges to the opposite plane surface of the screen and is placed in juxtaposition with the image screen, the left and right image bands 76 and 76' may be brought to both the left and right eyes respectively and exclusively of observers whose eyes are at 82 and 82' or at 81 and 81' and points therebetween.

While specific dimensions and proportions have been given above in connection with a composite viewing screen embodying this invention and comprising a lenticular resolving screen on the one hand for resolving left and right projected pictures into left and right stereoscopic image bands on an image screen, and a lenticular selective screen on the other hand for selectively bringing the left and right image bands on the image screen exclusively to the left and right eyes respectively of an observer, it is apparent that this has been done for purposes of illustration merely. Thus, the radius and width of the lenticular ridges may be modified considerably from the illustration given above in the practice of this invention. Moreover, the relative distances of the lenticular ridges from the image screen and the projectors may be varied considerably. Also it is not essential that the optical material out of which the lenticular ridges are made be brought into substantial juxtaposition with the surfaces of the image screen. While lenticular ridges have been described which are curved on one side thereof only, it is apparent that ridges curved on both sides or on the opposite side to the side shown, may also be employed in the practice of this invention. While the formulas above given are designed to aid in the construction of lenticular screens which may be employed in the practice of this invention, it is to be understood that the accuracy of the formulas is not essential to this invention.

The construction above illustrated shows a positive system of lenses adapted to form image bands which are not inverted with respect to the picture as a whole portrayed on the image screen. This invention is not limited, however, to such a construction, as it is apparent that small inverted images may be reinverted by a complementary lenticular screen so as to present the portrayed picture when ultimately brought to the eye as a substantially continuous whole.

A suitable lenticular screen may be made from a variety of materials. Any optical material such as glass, cellulose acetate, gelatin, or other substance may be used. Moreover, a lenticular screen may be made in a variety of ways. For example, a lenticular ridged screen can be made with a roller having a plurality of grooves about the periphery thereof corresponding to the lenticular ridges that are desired on the screen. Merely by passing such a roller over optical material while it is in a plastic state, an accurate lenticular ridged screen can be made by a single operation.

While a lenticular screen has been described which comprises vertical lenticular ridges and which is adapted to serve as a resolving screen or as a selective screen or both, it is apparent that other lenticular or other optical structures may be used which cause left and right image portions to fall upon an image screen at separate points thereon which are observable exclusively by both the left and right eyes of an observer. Thus, for example, a lenticular screen such as shown in Figs. 6 and 7 may be used having a plurality of partial spherical lenses 90 on lenticular screen 91. While the lenses are shown in staggered relation to one another, it is apparent that they may be arranged in other ways, such, for example, as with their centers on vertically extending lines. It is apparent that beams of light 92 and 92' incident upon lenticular screen 91 from projecting sources laterally disposed with respect thereto will form separate left and right image portions 93 and 93' on image screen 94. These left and right image portions may be brought exclusively to left and right eyes 95 and 95' respectively, by transmitted light through a corresponding selective lenticular screen 96.

If in the lenticular screen having partial spherical lenses above described in connection with Figs. 6 and 7, the lenses are arranged in staggered relation as shown, it is apparent that it is immaterial whether the projecting sources of left and right stereographic views are arranged laterally and horizontally or laterally and vertically with respect to the image screen on which the views are imaged, for in either case a plurality of independent left and right image portions will fall on the image screen so that the left and right image portions are alternately disposed with respect to each other along both vertical and horizontal lines. These left and right image portions being similarly positioned not only when the projecting sources are horizontally disposed to each other but also when they are vertically disposed, can readily be directed to both the left and right eyes respectively of an observer as above described. Similarly, when a grating is used, a grating could be made having a plurality of small opaque squares, for example, arranged in staggered relation to each other leaving transparent squares in staggered relation therebetween, and the projecting sources of left and right stereographic views could be disposed either laterally and horizontally or laterally and vertically with respect to each other. In either case a plurality of left and right image portions could be produced on the image which portions could be directed to both the left and right eyes respectively and exclusively of an observer by a selective screen as above described. It is therefore to be understood that when reference is made to projecting sources which are disposed laterally with respect to an image screen, that the term "laterally" is not limited to horizontal and lateral disposition but includes other lateral disposition such as vertical lateral disposition.

From the above, it is apparent that various optical structures such as screens having opaque and transparent areas or having lenticular ridges or other lenticular areas or structural characteristics may be employed to resolve left and right stereographic pictures projected on an image screen into a plurality of variously shaped independent left and right image portions which may or may not be in the form of vertical image bands and which may be directed to the left and right eyes respectively of an observer so that the observer will see the portrayed picture in stereoscopic relief.

The size of the independent left and right image portions which are imaged on the image screen, and which are directed exclusively to the left and right eyes of an observer according to this invention, is subject to considerable variation and depends in a certain degree upon the conditions of projection. In general, the image portions should not be so small that the optical structure for producing or viewing same would involve such minuteness of detail as to create undesirable diffraction phenomena. On the other hand, the image portions should not be so large as to cause undesirable loss of detail. It is apparent that, on large image screens such as moving picture screens, which are viewed from a considerable distance, the image bands may be considerably larger than when an image screen is used which is viewed nearer at hand. In the usual case, it is preferable to project a multiplicity of small left and right image portions upon the image screen. For example, from 10 to 50 image portions per inch is usually desirable. When the multiplicity of left and right image portions are viewed exclusively with the left and right eyes respectively, the multiplicity of left and right image portions become perfectly blended by the eye so that a continuous picture is observed with perfect detail and definition and the objects therein stand out realistically in stereoscopic relief.

The distance of the selective and resolving screen from the image screen is also subject to considerable variation. Ordinarily, it is preferable to have the selective and resolving screen in comparatively close proximity to the image screen so that the composite viewing screen may be in a comparatively compact unit. By increasing the distance of the selective screen from the image screen, however, the proximity of points in the theater from which perfect stereoscopic vision may be obtained is increased. When a multiplicity of small image portions are projected upon an image screen, the selective screen need only be from about half an inch to four inches from the image screen under average conditions.

A still further embodiment of this invention is shown in Fig. 2. In this embodiment of the invention, left and right stereographic pictures are projected from projecting sources 85 and 85'. Beams of light 86 and 86' are caused to pass through a resolving screen 87 made up of lenticular ridges 88. The lenticular ridges 88 cause the beams of light 86 and 86' to be resolved into left and right image bands 89 and 89' on image screen 60. The image bands 89 and 89' are observed by the left and right eyes 91 and 91' respectively in stereoscopic relief through a selective grating 92 which comprises opaque bands 93 and transparent bands 94. It is apparent in this embodiment of the invention that the left and right image bands 89 and 89' will be visible exclusively to the left and right eyes 91 and 91' of the observer. The image bands 89 and 89' may be determined (as readily calculated from the formulas given above in connection with the description of lenticular resolving screens) as to co-operate with grating 92 to portray the projected picture in stereoscopic relief. The position and dimensions of grating 92 may be determined readily by means of the formulas above given in connection with selective gratings or merely by trial. From the above, it is apparent that a lenticular resolving screen may be used in combination with an image screen and a selective screen in the form of a grating having alternate opaque and transparent areas. Similarly, a grating may be used as a resolving screen and the selective screen may be of lenticular or other optical construction.

The separation of the camera lenses can be varied in taking the left and right views of the subject, if desired to decrease or exaggerate the stereoscopic effect. Ordinarily, however, the camera lenses should be about 2.5 inches apart, as this distance corresponds to the average separation of a man's eyes, and permits left and right views to be taken which correspond to the left and right views which would naturally be observed and which may be portrayed according to this invention, so as to afford natural stereoscopic relief.

Definition and depth of form will greatly improve the stereoscopic effect upon projection. When processing films, it is well to keep the films of equal density so as to retain as much as possible the naturalness of the photographed subject. Additive and substractive color systems can be used successfully and to advantage in practicing this invention.

This invention is applicable to the portrayal of either motion pictures or still pictures in stereoscopic relief. Aerial photographs may, for example, be projected with advantage according to this invention to bring out stereoscopic relief.

Photographed scenes may not only be projected in stereoscopic relief, but also drawings produced by an artist. This invention is applicable, for example, to the projection of motion picture animated cartoons.

By exaggerating and decreasing the stereoscopic effect extraordinary and unusual effects can be produced.

The projection of drawings in stereoscopic relief is not confined to the projection of cartoons but may also be employed to advantage in connection with the projection of drawings such as relief maps. Also other drawings such as caricatures, etc., may be projected in the form of either motion or still pictures in stereoscopic relief according to this invention.

This invention is also applicable in connection with advertising signs.

This invention is not only adapted to the viewing of pictures which are projected from a film or other similar source, but is also applicable to the viewing in stereoscopic relief of objects scanned and reproduced by television apparatus. Thus, for example, left and right stereoscopic views of a subject can be brought to a focus in centered relation at an aerial image screen after having been passed through a resolving screen, e. g. of the character hereinabove described, so as to cause a plurality of left and right image portions having at least parts thereof independent of each other, to fall at the aerial image screen. The aerial image of this special character can then be scanned as is well-known in the television art and transmitted to a remote point where it can be reproduced by appropriate receiving devices of well-known character. By observing the reproduced image through a selecting screen of the character above described the left and right image elements of the reproduced image can be brought to the left and right eyes exclusively and respectively of the observer so that stereoscopic relief can be obtained by the observer. The aerial image which is initially formed and subsequently reproduced corresponds to the translucent image screen above described.

In television apparatus of the character just mentioned only one image is transmitted utilizing ether waves. Alternatively, left and right views of a subject can be independently imaged and the images independently scanned and independently transmitted by ether waves. Upon receiving the independent images (as translated to wave energy form) at a remote point they can be reproduced in well-known ways at the receiving end of the television system.

In reproducing the left and right images at a common translucent, e. g. aerial, screen in centered relation, the left and right images can be broken up into left and right image elements as in the manner hereinabove described by a suitable resolving screen and the left and right image elements can be viewed through a selective screen in the manner above described so that the left view elements will be directed to the left eye only of an observer and the right view elements will be directed to the right eye only of the observer, thus permitting the viewing in stereoscopic relief of the picture transmitted by television. Here again, left and right views of a subject are broken up so as to occur as left and right image elements at a translucent image screen and the image at the image screen is viewable in stereoscopic relief through a selecting screen according to this invention.

I claim:—

1. A composite viewing screen for viewing projected left and right stereoscopic views of a picture in stereoscopic relief which comprises the combination of a flat translucent image screen disposed in a single plane, a resolving screen of lenticular construction on one side of said image screen adapted to form on said image screen a multiplicity of small independent left and right image portions having parts thereof independent of each other, and a selective screen on the other side of said image screen adapted to direct light from parts of said left and right image portions which are independent of each other so as to be viewed by both the left and right eyes exclusively and respectively of an observer.

2. In apparatus for viewing a picture in relief, a flat translucent image screen disposed in a single plane, a resolving screen on one side thereof adapted to form a multiplicity of independent left and right elements of a picture having parts thereof independent of each other on said image screen, and a lenticular viewing screen on the other side of said image screen adapted to direct light from parts of said left and right picture elements which are independent of each other so as to be viewable by the left and right eyes exclusively and respectively of an observer.

DOUGLAS FREDWILL WINNEK COFFEY.